(12) United States Patent
Bartlett et al.

(10) Patent No.: US 6,545,814 B2
(45) Date of Patent: Apr. 8, 2003

(54) OPTICAL ARCHITECTURES FOR COMBINING MULTIPLE LAMPS IN LIGHT VALVE PROJECTORS

(75) Inventors: Terry A. Bartlett, Dallas, TX (US); Keith H. Elliott, Plano, TX (US); D. J. Segler, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 29 days.

(21) Appl. No.: 09/750,627

(22) Filed: Dec. 28, 2000

(65) Prior Publication Data

US 2001/0048562 A1 Dec. 6, 2001

Related U.S. Application Data

(60) Provisional application No. 60/173,688, filed on Dec. 28, 1999.

(51) Int. Cl.[7] .......................... G02B 27/14; G02B 7/18; G03B 21/28
(52) U.S. Cl. ............... 359/636; 359/639; 359/634; 359/625; 359/618; 359/831; 359/834; 353/98; 340/148
(58) Field of Search ................... 359/634, 625, 359/636, 618, 640, 637, 831, 833, 834, 373, 638, 639, 462; 353/30, 31, 98; 340/148, 149

(56) References Cited

U.S. PATENT DOCUMENTS

| | | | | |
|---|---|---|---|---|
| 3,547,513 A | * | 12/1970 | Sheiner | 359/831 |
| 4,344,671 A | * | 8/1982 | Lang | 359/618 |
| 5,452,135 A | * | 9/1995 | Maki et al. | 359/834 |
| 5,905,595 A | * | 5/1999 | Minami | 359/618 |
| 5,907,434 A | * | 5/1999 | Sekine et al. | 359/618 |
| 5,917,655 A | * | 6/1999 | Lehnen et al. | 359/625 |
| 6,139,156 A | * | 10/2000 | Okamori et al. | 353/98 |
| 6,166,764 A | * | 12/2000 | Sakata | 348/148 |

\* cited by examiner

Primary Examiner—Loha Ben
(74) Attorney, Agent, or Firm—Charles A. Brill; Wade James Brady, III; Frederick J. Telecky, Jr.

(57) ABSTRACT

An integrating rod (100) for combining light beams from two or more sources. A first light beam (104) enters the integrating rod 100 through a first entrance face (102) to a first reflecting face (110). The light is reflected by the first reflecting face (110) and travels along the major axis (114) of the integrating rod (100) to an exit face (116). A second light beam (108) from a second light source enters the integrating rod (100) through a second entrance face (106). The second light beam may be reflected by a second reflecting face (112) and travels along the major axis (114) to the exit face (116). The two light beams experience multiple reflections as they travel along the integrating rod and leave the integrating rod (100) through the exit face (116) as a single homogenous light beam.

22 Claims, 2 Drawing Sheets

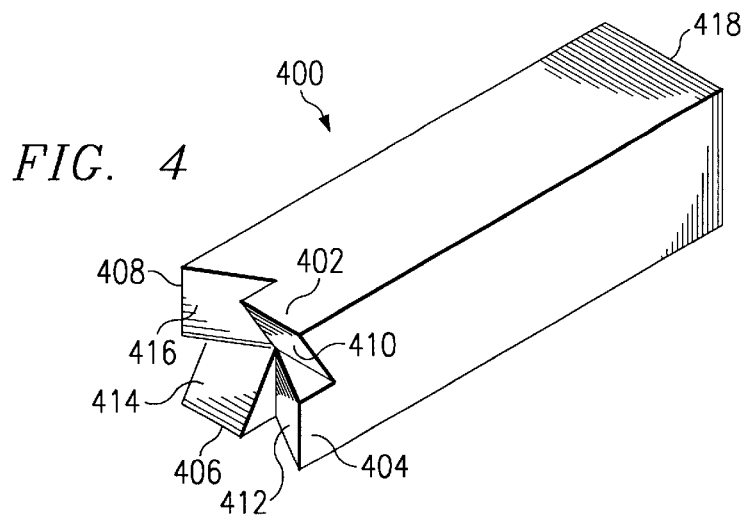
FIG. 4
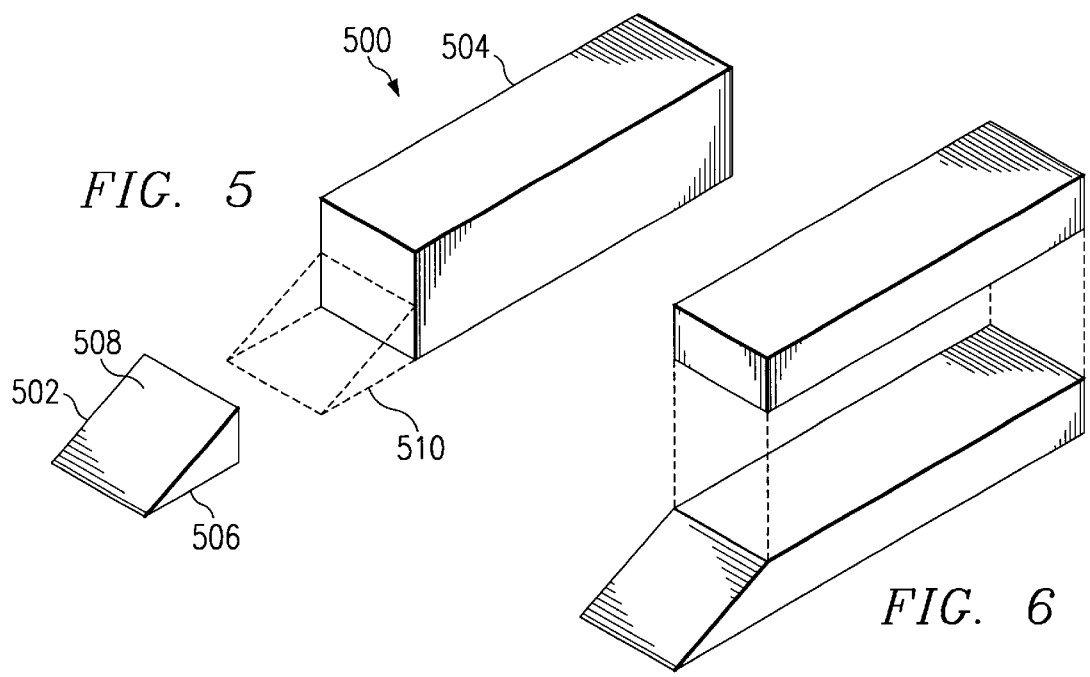
FIG. 5
FIG. 6
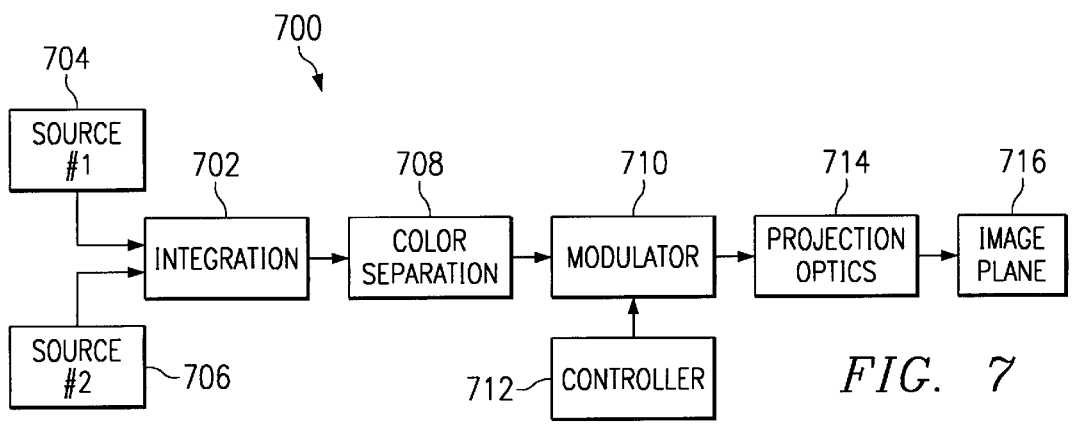
FIG. 7

OPTICAL ARCHITECTURES FOR COMBINING MULTIPLE LAMPS IN LIGHT VALVE PROJECTORS

This application claims priority under 35 USC §119(e)(1) of provisional application No. 60/173,688 filed Dec. 28, 1999.

FIELD OF THE INVENTION

This invention relates to the field of display systems, more particularly to display systems using multiple light sources in combination with a spatial light modulator.

BACKGROUND OF THE INVENTION

Many new types of displays systems have been developed that use a spatial light modulator or light valve in combination with an illumination source to project an image. These display systems are capable of providing high resolution, high contrast images having an excellent color gamut. One of the key criteria consumers use to distinguish various display systems is the brightness of the image. High image brightness is critical in the marketplace. High projector flux output enables high image brightness which enables viewers to clearly see the projected image, even in venues having a high ambient light level, and enables projection of very large images.

The brightness of the projected image is limited by the luminance, lumens per emitting area per solid angle, of the light source used in conjunction with the modulator. High output flux levels are especially difficult to achieve with small light valves such as the digital micromirror device (DMD™). The DMD, which is less than an inch across, has a small etendue or area-solid angle product.

Xenon and metal halide arc lamps are very high luminance light sources, but are unacceptable for many display system applications because of their short lifetimes, generally less than 2000 hours, high power requirements and safety concerns. A few arc lamps, such as high-pressure mercury lamps, have a long lifetime, between 6000 and 8000 hours, and a small etendue, but do not provide a high total flux. One technique that has been used to increase the brightness of a projected image is to use three lamps in combination with dichroic filters. The output of each lamp is filtered to provide a single primary colored light beam. The lamps sequentially are pulsed to peak the flux out of the lamp during a portion of the frame period. In concert, the three lamps act as a single sequential color source having a greater brightness than a single lamp. Unfortunately, pulsing the lamps reduces the stability of the arc and shortens the lifetime of the lamp.

What is needed is a long-life, high luminance, high flux light source that has a small etendue to enable efficient coupling to a small light valve.

SUMMARY OF THE INVENTION

Objects and advantages will be obvious, and will in part appear hereinafter and will be accomplished by the present invention that provides a method and system for combining multiple light sources in light valve projectors. One embodiment of the claimed invention provides an integrating rod comprising: a first entrance face operable to transmit a first light beam, a first reflection face operable to reflect the first light beam, a second entrance face operable to transmit a second light beam, and an integrator body operable to transmit the first and second light beams to an exit face. Often a second reflecting face is included to reflect the second light beam. The integrating rod efficiently couples the two light beams into the integrator body where they are homogenized prior to exiting the integrator body.

The disclosed optical architectures enable two small-arc light sources to be used instead of one larger light source. The small-arc light sources have a much longer life and a smaller etendue that is more efficiently coupled to a small light valve such as a DMD.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a perspective view of an integrating rod according to a third embodiment of the present invention.

FIG. 5 is an exploded perspective view of two prisms combined to form the integrating rod of FIG. 3.

FIG. 6 is a second exploded perspective view of two prisms combined to form the integrating rod of FIG. 3.

FIG. 7 is a block diagram of a display system using the novel integrator rod described herein.

DETAILED DESCRIPTION OF THE PREFERRED EMBODIMENTS

A method and apparatus for combining multiple light sources has been developed that provides a long-life, high luminance, high flux light source with a small etendue to enable efficient coupling to a small light valve. Combining the light beams from multiple lamps that have the same spectrum and polarization has been difficult in the past due to physical interference between the lamps and the reflectors and lenses used to gather and focus the light.

Figure 1:
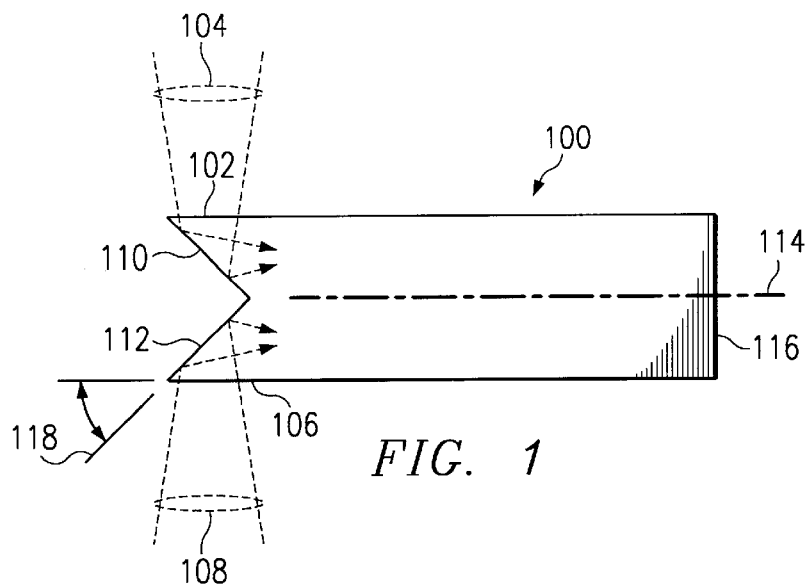
FIG. 1 is a side view of an integrating rod according to a first embodiment of the present invention.

The disclosed method and apparatus efficiently combines multiple small-arc lamps to increase the total flux of the light source without resorting to pulsing or other methods that reduce the lifetime of the lamp. The apparatus uses an integrating rod 100, shown in FIG. 1, similar to those used in the illumination optics of many current display systems. Unlike other integrating rods, the new integrating rod has a first entrance face 102 to admit a first light beam 104 and a separate second entrance face 106 to admit a second light beam 108.

The integrating rod 100 can be either a solid block of a transparent material such as glass or a hollow tube with reflective inner surfaces. Once the first light beam 104 enters the integrating rod 100 it strikes, and is reflected by, a first reflection face 110. The first reflection face 110 can be a mirrored surface if necessary, or can rely on internal reflection occurring as the light beam traveling through a glass integrating rod meets an interface between the glass and the surrounding air. Internal reflection occurs when:

$$\theta_i \leq \sin^{-1}(I_g * \sin(\sin^{-1}(1/I_g) - \theta_b))$$

where $\theta_i$ is the incident angle of the light, $\theta_b$ is the bevel angle 118, and $I_g$ is the index of refraction of the glass. If the above equation is not satisfied, the beveled reflection face must be coated with a reflective coating. The second reflecting face 112 also reflects the second beam of light 108.

Figure 2:
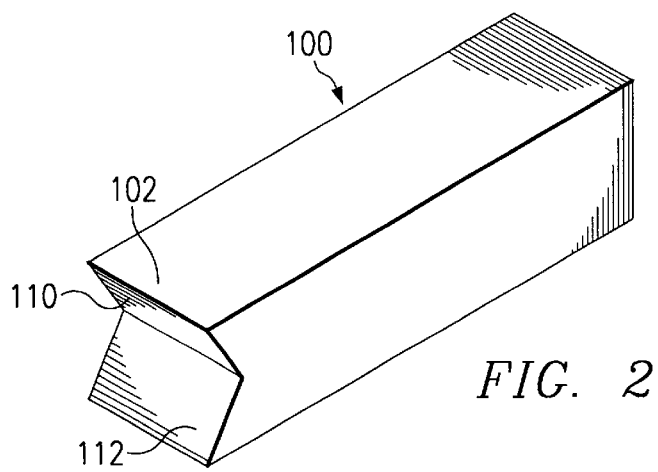
FIG. 2 is a perspective view of the integrating rod of FIG. 1.

Once each of the incident light beams is reflected, they travel along the major axis 114 of the integrating rod 100. As the beams of light travel along the integrating rod 100, they experience multiple reflections and become uniformly blended, uniformly filling the cross section of the integrating rod 100. The cross section of the integrating rod 100 is chosen to match the aspect ratio and size of the light valve used to modulate the homogenized light. FIG. 2 is a perspective view of the integrating rod of FIG. 1.

FIG. 7 is a schematic view of a display system 700 having an integrator 702 according to the disclosed invention. Light from two sources 704, 706 is combined and homogenized by the integrator 702. The integrator 702 is an integrating rod of any of the novel embodiments described herein. After being combined and homogenized, the light leaves the integrating rod and travels through a color separation device 708 where it is separated into at least three primary color light beams. The color separation device 708 typically is either a color wheel that separates the light beam into three sequential primary color beams, or a color splitting prism assembly that uses a set of dichroic filters to separate the beam.

The primary color light beams are modulated by one or more modulators 710 that receive image data from a controller 712. When the color separation device 708 is a color wheel, one modulator 710 typically is used. When the color separation device 708 is a color splitting prism, three modulators 710 are used. Some embodiments use both a color wheel and a color splitting prism to provide light to two modulators. The two modulator systems typically provide red light to one modulator, and alternately provide green and blue light to the second modulator. The modulated primary color light beams are focused onto an image plane 716 by projection optics 714, to form an image.

Figure 3:
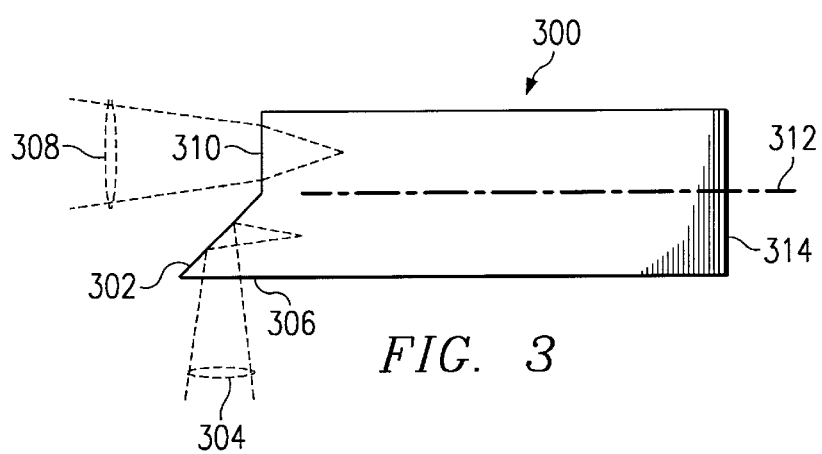
FIG. 3 is a side view of an integrating rod according to a second embodiment of the present invention.

FIG. 3 is a side view of another embodiment of the disclosed integrating rod 300. The integrating rod 300 shown in FIG. 3 has only one beveled face 302. A first light beam 304 enters the integrating rod 300 through a first entrance face 306 and is reflected by the beveled first reflection face 302 as described above with regard to integrating rod 100. A second light beam 308 enters the integrating rod 300 through a second entrance face 310. Both the reflected first light beam and the second light beam travel along the major axis 312 of the integrator rod 300 and are blended into a single homogenized light beam by the time they leave the integrating rod 300 through exit face 314.

While the previous two embodiments of the disclosed integrator rod have combined two lamps, other embodiments are possible that will combine more than two lamps. FIG. 4 is a perspective view of an integrating rod 400 used to combine the light beams from four separate light sources. In FIG. 4, the first light beam enters the integrating rod 400 through a first entrance face 402 and is reflected by a first reflection face 410. A second light beam enters the integrating rod 400 through a second entrance face 404 and is reflected by a second reflection face 412. A third light beam enters the integrating rod 400 through a third entrance face 406 and is reflected by a third reflection face 414. A fourth light beam enters the integrating rod 400 through a fourth entrance face 408 and is reflected by a fourth reflection face 416.

By combining four light source, the integrating rod 400 of FIG. 4 increases the image brightness and provides a great deal of redundancy to a display system using the four light sources. Unlike display systems relying on a single light source, the display system using four light sources can continue to operate after experiencing a lamp failure, although at a reduced brightness level. This feature is very important not only for applications in which a consumer may not be comfortable changing the lamp, but also in situations in which even a brief interruption in the display would be disastrous.

The integrating rod 400 of FIG. 4 is difficult to manufacture. While it is possible to mold integrating rods for some applications, many applications require polished glass integrating rods. One solution is to use a composite integrating rod such as those shown in FIGS. 5 and 6. The integrating rod 500 of FIG. 5 is formed from two easy to manufacture pieces. One of the pieces is a rectangular prism 504 and the other piece is a triangular prism 502. The triangular prism 502 includes an entrance face 506 and a reflection face 508. When the triangular prism 502 is held against the rectangular prism 504 so that light passes from the triangular prism to the rectangular prism without reflecting at the interface, the integrating rod 500 of FIG. 5 approximates the integrating rod of FIG. 3.

FIG. 6 is another example of a two-piece integrating rod 600 that emulates the integrating rod of FIG. 3. Once again, by pressing the two pieces together tightly, light travels across the boundary between the two pieces and the two pieces cooperative act as a single integrator similar to FIG. 3. Rather than pressing the pieces together tightly, the two prisms are sometimes bonded to one another.

Many other embodiments of the disclosed integrating rod exist. Various embodiments allow the efficient coupling of any number of light beams into a single homogenous light beam. The various embodiments are likewise fabricated either from a single piece of optical glass, or from multiple prisms attached to each other. The attachment of the prisms in multi-prism applications preferably defeats all internal reflection at the interface between the prism components. The internal reflection is defeated either by intimate contact between the pieces, or by the use of an optical adhesive to bond the prisms together.

Thus, although there has been disclosed to this point a particular embodiment for optical architectures for combining multiple lamps, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. An integrating rod comprising:
   a first entrance operable to transmit a first light beam;
   a first reflection face operable to reflect said first light beam;
   a second entrance operable to transmit a second light beam; and
   an integrator body operable to combine said first and second light beams and to transmit said combined beam to an exit.

2. The integrating rod of claim 1, wherein said first reflection face is mirrored.

3. The integrating rod of claim 1, wherein said first entrance and said first reflection face are faces of a triangular prism attached to said integrator body.

4. The integrating rod of claim 1, said integrator body comprised of at least two prisms, one of said prisms comprising said first entrance and said first reflection face and a first portion of said exit, another of said prisms comprising said second entrance and a second portion of said exit, said prisms attached to allow light to pass between said prisms.

5. The integrating rod of claim 4, said integrator body comprised of four prisms.

6. The integrating rod of claim 1, said integrating rod having a major axis, said first entrance parallel to said major axis, and said second entrance perpendicular to said major axis.

7. The integrating rod of claim 1, said integrating rod having a major axis, said first and said second entrances parallel to said major axis.

8. The integrating rod of claim 1, further comprising:
   a third entrance operable to transmit a third light beam;
   a third reflection face operable to reflect said third light beam;
   a fourth entrance operable to transmit a fourth light beam; and
   a fourth reflection face operable to reflect said fourth light beam, said integrator body further operable to transmit said third and fourth reflected light beams to said exit.

9. The integrating rod of claim 1, further comprising a second reflection face operable to reflect said second light beam.

10. The integrating rod of claim 9, wherein said second reflection face is mirrored.

11. The integrating rod of claim 9, wherein said second entrance and said second reflection face are faces of a triangular prism attached to said integrator body.

12. A display system comprising:
   at least two light sources, each of said light sources for providing a source beam of light along a source path;
   an integrating rod positioned to receive said beams of light from said at least two light sources and to combine said beams of light into a combined beam of light traveling along an illumination path, said integrating rod comprising:
      a first entrance operable to transmit a first source beam of light;
      a first reflection face operable to reflect said first source beam of light;
      a second entrance operable to transmit a second source beam of light; and
      an integrator body operable to transmit said first and second source beams of light to an exit;
   at least one spatial light modulator receiving said combined beam of light and modulating said beam of light according to image data received by said spatial light modulator; and
   at least one projection lens for focusing said modulated beam of light onto an image plane.

13. The display system of claim 12, wherein said first reflection face is mirrored.

14. The display system of claim 12, wherein said first entrance and said first reflection face are faces of a triangular prism attached to said integrator body.

15. The display system of claim 12, said integrator body comprised of at least two prisms, one of said prisms comprising said first entrance and said first reflection face and a first portion of said exit, another of said prisms comprising said second entrance and a second portion of said exit, said prisms attached to allow light to pass between said prisms.

16. The display system of claim 15, said integrator body comprised of four prisms.

17. The display system of claim 12, said integrating rod having a major axis, said first entrance parallel to said major axis, and said second entrance perpendicular to said major axis.

18. The display system of claim 12, said integrating rod having a major axis, said first and said second entrances parallel to said major axis.

19. The display system of claim 12, said integrating rod comprising:
   a third entrance operable to transmit a third light beam;
   a third reflection face operable to reflect said third light beam;
   a fourth entrance operable to transmit a fourth light beam; and
   a fourth reflection face operable to reflect said fourth light beam, said integrator body further operable to transmit said third and fourth reflected light beams to said exit.

20. The display system of claim 12, said integrating rod comprising a second reflection face operable to reflect said second light beam.

21. The display system of claim 20, wherein said second reflection face is mirrored.

22. The display system of claim 20, wherein said second entrance and said second reflection face are faces of a triangular prism attached to said integrator body.

* * * * *